(No Model.)
A. C. DOWNEY.
HARROW.
No. 389,138. Patented Sept. 4, 1888.
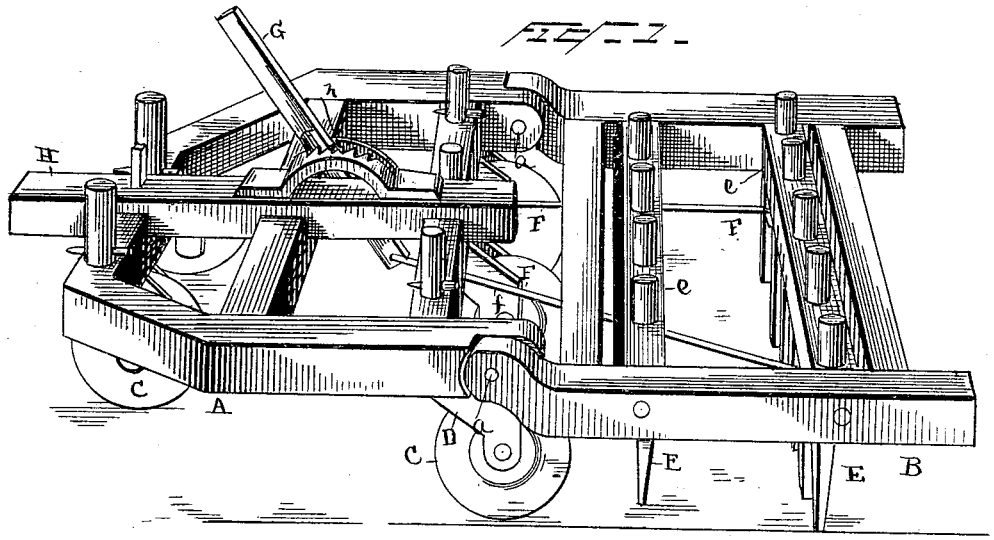
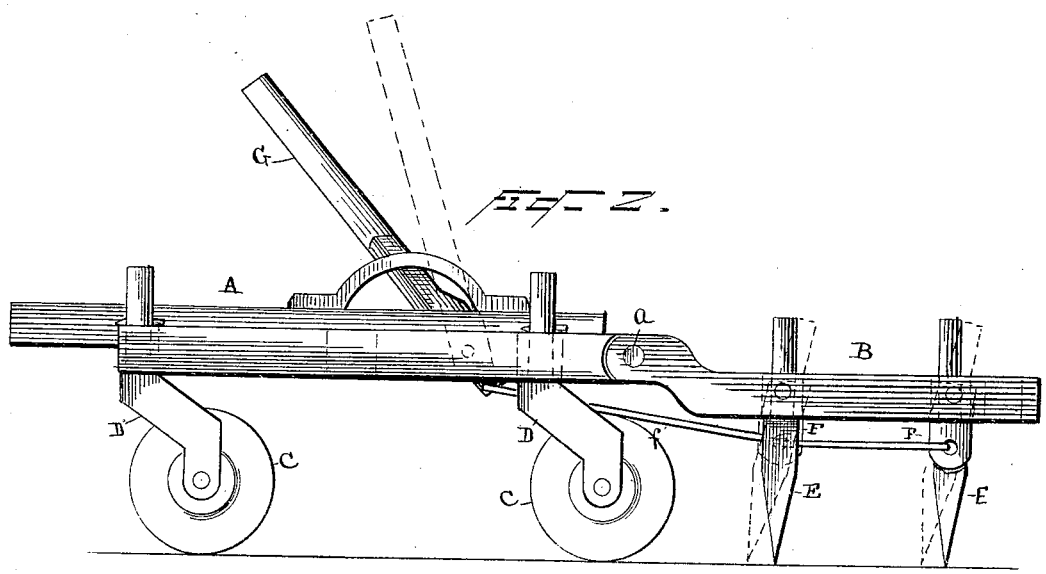
WITNESSES,
Morris A. Clark,
Van Buren Hillyard.
INVENTOR.
Alva C. Downey.
By R.S. & A.P. Lacey,
Attys.

UNITED STATES PATENT OFFICE.

ALVA C. DOWNEY, OF SPRING LICK, ASSIGNOR OF ONE-HALF TO N. C. TILFORD, OF CANEYVILLE, KENTUCKY.

HARROW.

SPECIFICATION forming part of Letters Patent No. 389,138, dated September 4, 1888.

Application filed April 4, 1888. Serial No. 269,559. (No model.)

*To all whom it may concern:*

Be it known that I, ALVA C. DOWNEY, a citizen of the United States, residing at Spring Lick, in the county of Grayson and State of Kentucky, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined disk and scratch-tooth harrow.

The purpose of the invention is the provision of a harrow that will cut through stubble, clods, and weeds, and which will present an extended surface, and be composed of two halves pivoted together, the front half being supported on cutter-disks that have a swivel-connection with the frame, so that the said cutter-disks can adapt themselves to the draft of the harrow, and will at the same time form rolling supports that will facilitate the turning of the harrow at each end of a row or whenever desired.

The improvement consists in having the frame composed of two halves, which are pivotally connected together, and in having the front half of the frame mounted on cutting-disks that have the shanks of their supports connected by a swivel-joint with the frame, and in having the rear half of the frame provided with scratch-teeth, which are secured to pivoted tooth-bars, so that the angle of the teeth can be varied at will.

The improvement further consists of the novel features which hereinafter will be more fully described and claimed, and shown in the annexed drawings, in which—

Figure 1 is a perspective view of my harrow; and Fig. 2, a side view, parts being broken away, of the harrow, showing the adjustment of the scratch-teeth by dotted lines.

The harrow-frame is composed of the two parts or halves A and B, that are pivoted together by the rivets or bolts *a*. The front half, A, of the frame is provided with the cutting-disks C, which are journaled in frames D, that have their shanks passed through openings in the cross-bars of the frame and journaled in the said cross-bars, so that the cutting-disks can swing around and adapt themselves to the draft of the harrow. The rear half, B, of the frame is provided with the scratch-teeth E, that are secured in the tooth-bars *e*, which are journaled at their ends in the side beams of the said half of the frame, forming a pivotal connection between the said tooth-bars *e* and the half of the frame, so that the teeth can be set at any angle or slant. The eyebolts F are inserted in the pivoted tooth-bars *e* from their under side and are connected with the hand-lever G by the connection *f*. Each bar E is provided with an eyebolt near each end, and the connection *f* connects the eyebolts of the bars and is attached to the hand-lever, so that all the tooth-bars can be adjusted simultaneously. The hand-lever G is pivoted to the draft-beam H, and is adapted to engage with the notches of the segment *h* to hold it in an adjusted position.

Having thus described my invention, what I claim, and desire to secure by Letters Patent, is—

1. The herein-specified harrow, composed of the frame consisting of a front and rear half, the two halves being pivotally connected together and having the front half of the frame mounted on cutting-disks, which have a swivel-connection therewith, and having the rear half of the frame provided with scratching-teeth, substantially as described.

2. The combination, with the harrow-frame made in two parts, which are pivoted together, of the cutting-disks supporting the front half of the frame and having a swivel-connection therewith, the tooth-bars pivotally connected with the rear frame and having scratching-teeth, the eyebolts, the lever and segment, and the connection between the eyebolts and the said lever, substantially as and for the purpose described.

In testimony whereof I affix my signature in presence of two witnesses.

ALVA C. DOWNEY.

Witnesses:
J. PAYTON,
GEO. HOUSE.